United States Patent
Matei et al.

(10) Patent No.: US 11,321,504 B2
(45) Date of Patent: May 3, 2022

(54) LEARNING CONSTITUTIVE EQUATIONS OF PHYSICAL COMPONENTS WITH CONSTRAINTS DISCOVERY

(71) Applicant: Palo Alto Research Center Incorporated, Palo Alto, CA (US)

(72) Inventors: Ion Matei, Sunnyvale, CA (US); Johan de Kleer, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 710 days.

(21) Appl. No.: 15/974,968

(22) Filed: May 9, 2018

(65) Prior Publication Data

US 2019/0347370 A1 Nov. 14, 2019

(51) Int. Cl.
| | | |
|---|---|---|
| G06F 30/20 | (2020.01) | |
| G06F 17/16 | (2006.01) | |
| G06F 17/17 | (2006.01) | |
| G06F 111/10 | (2020.01) | |
| G06F 111/20 | (2020.01) | |

(52) U.S. Cl.
CPC .......... *G06F 30/20* (2020.01); *G06F 17/16* (2013.01); *G06F 17/175* (2013.01); *G06F 2111/10* (2020.01); *G06F 2111/20* (2020.01)

(58) Field of Classification Search
CPC ........ G06F 30/20; G06F 17/16; G06F 17/175; G06F 2111/20; G06F 2111/10
See application file for complete search history.

(56) References Cited

U.S. PATENT DOCUMENTS

| 9,982,903 B1* | 5/2018 | Ridder ................. F24F 11/0001 |
| 2008/0294578 A1* | 11/2008 | de Kleer ............. G06F 11/2257 706/12 |
| 2015/0199471 A1* | 7/2015 | Thorsteinsson ......... G06F 30/15 703/2 |
| 2018/0107925 A1* | 4/2018 | Choi ...................... G06N 3/084 |

OTHER PUBLICATIONS

Matei, I., de Kleer, J., & Minhas, R. (Jun. 2018). Learning constitutive equations of physical components with constraints discovery. In 2018 Annual American Control Conference (ACC) (pp. 4819-4824). IEEE. (Year: 2018).*

H. Alwi, C. Edwards, and C.P. Tan. Fault Detection and Fault-Tolerant Control Using Sliding Modes. Springer, London, 1974 (ISBN: 0-12-078250-2). pp. 22-27.

Y. Bard. Nonlinear Parameter Estimation. Academic, New York, 1973 (ISBN: 978-0-85729-649-8). pp. 54-61.

D.P. Bertsekas. Nonlinear Programming. Athena Scientific, 1999. barrier methods: pp. 370-373, penalty methods: pp. 390-388, primal-dual methods: 463-471, sequential programming: 439-446.

(Continued)

*Primary Examiner* — Chuen-Meei Gan
(74) *Attorney, Agent, or Firm* — Fay Sharpe LLP (57) ABSTRACT

The following relates generally to system modeling. Some embodiments described herein learn a representation of the parameter feasibility space that make model parameter tuning easier by constraining the search space, thus enabling physical interpretation of the learned model. They also enable model-based system analytics (controls, diagnosis, prognostics) by providing a system model.

14 Claims, 9 Drawing Sheets

FEASABILITY SPACE (a) COBYLA (56) References Cited

OTHER PUBLICATIONS

Hans-Georg Beyer and Hans-Paul Schwefel. Evolution strategies—a comprehensive introduction. Natural Computing, 1(1):3-52, May 2002.

T. Blochwitz, M. Otter, M. Arnold, C. Bausch, C. Clau, H. Elmqvist, A. Junghanns, J. Mauss, M. Monteiro, T. Neidhold, D. Neumerkel, H. Olsson, J. v. Peetz, S. Wolf, Atego Systems Gmbh, Qtronic Berlin, Fraunhofer Scai, and St. Augustin. The functional mockup interface for tool independent exchange of simulation models. In In Proceedings of the 8th International Modelica Conference, 2011.

S. Brunton, J.N. Kutz, and J. Proctor. Data-driven discovery of governing physical laws. SIAM News, 50(1), 2017.

Michael B Chang, Tomer Ullman, Antonio Torralba, and Joshua B Tenenbaum. A compositional object-based approach to learning physical dynamics. arXiv preprint arXiv:1612.00341, 2016.

G. Cybenko. Approximation by superpositions of a sigmoidal function. Mathematics of Control, Signals and Systems, 2(4):303-314, Dec. 1989.

Johan De Kleer and Brian C Williams. Diagnosing multiple faults. Artificial intelligence, 32(1):97-130, 1987.

R. Fletcher and C. M. Reeves. Function minimization by conjugate gradients. The Computer Journal, 7(2):149-154, 1964.

Peter Fritzson. Introduction to Modeling and Simulation of Technical and Physical Systems with Modelica IEEE Press. Wiley, Hoboken, NJ, 2011. pp. 29-35.

Carlos E. Garca, David M. Prett, and Manfred Morari. Model predictive control: Theory and practicea survey. Automatica, 25(3):335-348, 1989.

Robert Hooke and T. A. Jeeves. "Direct Search" Solution of Numerical and Statistical Problems. J. ACM, 8(2):212-229, Apr. 1961.

Andrew K.S. Jardine, Daming Lin, and Dragan Banjevic. A review on machinery diagnostics and prognostics implementing condition-based maintenance. Mechanical Systems and Signal Processing, 20(7):1483-1510, 2006.

Eric Jones, Travis Oliphant, Pearu Peterson, et al. SciPy: Open source scientific tools for Python, 2001—.https://www.scipy.org/citing.html.

James Kennedy and Russell C. Eberhart. Particle swarm optimization. In Proceedings of the IEEE International Conference on Neural Networks, pp. 1942-1948, 1995.

D. Kraft. A Software Package for Sequential Quadratic Programming. Deutsche Forschungs- und Versuchsanstalt fur Luft- und Raumfahrt Koln: Forschungsbericht. Wiss. Berichtswesen d. DFVLR, 1988.

I. Matei, A. Ganguli, T. Honda, and J. de Kleer. The case for a hybrid approach to diagnosis: A railway switch. In Proceedings of the $26^{th}$ International Workshop on Principles of Diagnosis (DX-2015), pp. 225-232, Aug. 2015.

Melanie Mitchell. An Introduction to Genetic Algorithms. MIT Press, Cambridge, MA, USA, 1998.

Jorge Nocedal. Updating Quasi-Newton Matrices with Limited Storage. Mathematics of Computation, 35(151):773-782, 1980.

Linda Petzold, Shengtai Li, Yang Cao, and Radu Serban. Sensitivity analysis of differential-algebraic equations and partial differential equations. Computers and Chemical Engineering, 30(10):1553-1559, 2006.

M. J. D. Powell. An ecient method for finding the minimum of a function of several variables without calculating derivatives. The Computer Journal, 7(2):155-162, 1964.

M. J. D. Powell. On Search Directions for Minimization Algorithms. Mathematical Programming, 4(2):193-201, Apr. 1973.

M.J.D. Powell. A view of algorithms for optimization without derivatives. Technical report, University of Cambridge, UK, May 2007.

Samuel H. Rudy, Steven L. Brunton, Joshua L. Proctor, and J. Nathan Kutz. Data-driven discovery of partial differential equations. Science Advances, 3(4), 2017.

Michael Schmidt and Hod Lipson. Distilling free-form natural laws from experimental data. Science, 324(5923):81-85, 2009.

\* cited by examiner

FIG. 7C (d) L-BFGS-B

FIG. 7D

LEARNING CONSTITUTIVE EQUATIONS OF PHYSICAL COMPONENTS WITH CONSTRAINTS DISCOVERY

BACKGROUND

The present application relates generally to system modeling.

System models are often incomplete due to proprietary reasons. However, having complete system models is advantageous because complete system models enable system analytics such as: controls, diagnostics, prognostics and (re-)design.

A current approach to system modeling involves a pure machine learning approach where system/component models are causal black-box models. They do not have a physical semantics.

BRIEF DESCRIPTION

Some embodiments described herein learn a representation of the parameter feasibility space that makes model parameter tuning easier by constraining the search space, thus enabling physical interpretation of the learned model. They also enable model-based system analytics (controls, diagnosis, prognostics) by providing a system model.

In accordance with one aspect of the present application, there is an apparatus for modeling a component, wherein the component has a vector of unknown parameters, and the apparatus comprises: at least one processor; and at least one memory including computer program code. The at least one memory and the computer program code may be configured to, with the at least one processor, cause the apparatus at least to: build a binary function that models the feasibility of points based on the vector of unknown parameters; at a first iteration, build a sequence of approximations of the binary function; and at a second iteration, update the sequence of approximations of the binary function at least in part based on a minimum of a cost function of the vector of unknown parameters.

In the apparatus as described in the preceding paragraph, the binary function may be $p(w) \in \{0,1\}$, where: $w$ is the vector of unknown parameters; and $p(w)=1$ if $w$ is feasible and zero otherwise. The sequence of approximations may be represented by $q(w)$, where $w$ is the vector of unknown parameters; and at the first iteration, $q(w)$ may be set to 0.5 for all $w$. The cost function may be $J(w)$, where $w$ is the vector of unknown parameters; the update of the sequence of approximations of the binary function happens by using an optimization problem of the $J(w)$; and the optimization problem is constrained by $g_i(w) \leq 0$, where $i=1, 2$ and $g_i$ is a constraint function. At the first iteration, the sequence of approximations of the binary function may be built by minimizing a cross-entropy loss function. The at least one memory and the computer program code may be further configured to, with the at least one processor, further cause the apparatus to: subsequent to the second iteration, iterate by updating the sequence of approximations of the binary function at least in part based on the minimum of the cost function of the vector of unknown parameters; and at a subsequent iteration, generate an audio or visual alarm based on an updated sequence of approximations of the binary function. In some embodiments, the component is one of: a rail switch, a circuit, an electric motor, a wind turbine, an elevator, or a mechanical break.

In another aspect, an apparatus for modeling a component is provided. The component may have a vector of unknown parameters, and the apparatus comprises at least one processor; and at least one memory including computer program code. The at least one memory and the computer program code may be configured to, with the at least one processor, cause the apparatus at least to: build a binary function that models the feasibility of points based on the vector of unknown parameters; build a sequence of approximations of the binary function; and follow an iterative process with at least two iterations, each iteration including: updating the sequence of approximations of the binary function by taking into account a minimum of a cost function of the vector of unknown parameters.

In some embodiments, the cost function is subject to constraint that encourages exploration of points with a higher uncertainty over exploration of points with a lower uncertainty. In some implementations, the constraint loses importance as the process iterates. In some implementations, the constraint satisfies a requirement that the constraint disappears as a number of iterations approaches infinity. In some implementations, the cost function is subject to constraint that encourages exploration of a point that has an uncertainty that is higher than an uncertainty of another point.

In another aspect, a method for modeling a component is provided, wherein the component has a vector of unknown parameters, and the method comprises: building a binary function that models the feasibility of points based on the vector of unknown parameters; during a first iteration, building a sequence of approximations of the binary function; and during a second iteration, updating the sequence of approximations of the binary function at least in part based on a minimum of a cost function of the vector of unknown parameters.

One aspect resides in an explore-exploit strategy that enables learning the representation of the feasibility set.

Another aspect resides in a method for learning parameters of acausal components.

Another aspect resides in a method for learning representations of the feasibility set of parameters of acausal components.

Another aspect resides in a method for learning parameters of acausal components and representations of the feasibility set of parameters of acausal components.

Another aspect resides in a method for jointly learning parameters of acausal components and representations of the feasibility set of parameters of acausal components.

Another aspect resides in a method for jointly learning physically interpretable models of acausal components.

Another aspect resides in a method for enabling model-based diagnostics and prognostics techniques for partially known systems.

Broadly, some embodiments described herein relate to diagnosis and/or modeling of rail switches, circuits, electric motors, wind turbines, elevators, mechanical breaks, other mechanical components, and so forth.

Prior systems had not been able to generate enough data. Advantageously, the systems and methods described herein generate an increased amount of relevant data. For example, the use of the disclosed constraints generates an increased amount of relevant data.

DETAILED DESCRIPTION

The systems and methods described herein address the problem of learning constitutive equations of acausal physical components in partially known physical systems. This enables building an improved model of a system.

The parameters of constitutive equations satisfy a set of unknown constraints. To jointly learn parameters and constraints, the systems and methods described herein propose an iterative procedure. The procedure favors exploration during the initial iterations. This enables learning a model for the constraints. As the constraints learning advances more weight is given to finding the constitutive equations. The results of this invention can be used to augment the SysX platform capabilities, or as plugins in system analytics tools.

Furthermore, one implementation is tested on a demonstrative example in which the model of a nonlinear resistor is learned.

In one aspect, the following describes learning acausal representations of system/components. Some embodiments learn constitutive equations of unknown system/components. They can be represented using parametrized machine learning type of models, e.g., regression models, neural networks. The model parameters are constrained to leave in an unknown feasibility set. Some embodiments involve an iterative procedure that learns both the parameters and a representation of the feasibility set. In some embodiments, the feasibility set representation model is probabilistic and is updated using a machine learning algorithms for binary classification (e.g., logistic regression, neural networks with softmax functions on the last layer). Training data for learning the feasible set representation may be acquired during the parameters estimation optimization process. In the beginning, exploration of the search space with high uncertainty is encouraged, then as the learning process progresses, focus is shifted towards the parameter estimation.

Other constraints can be included in the feasible set representation, such as dissipativity constraints. The component model could be represented as Gaussian Processes which opens the door to other derivative-free algorithms and global optimization solutions, such as Bayesian Optimization.

Introduction

Figure 1:
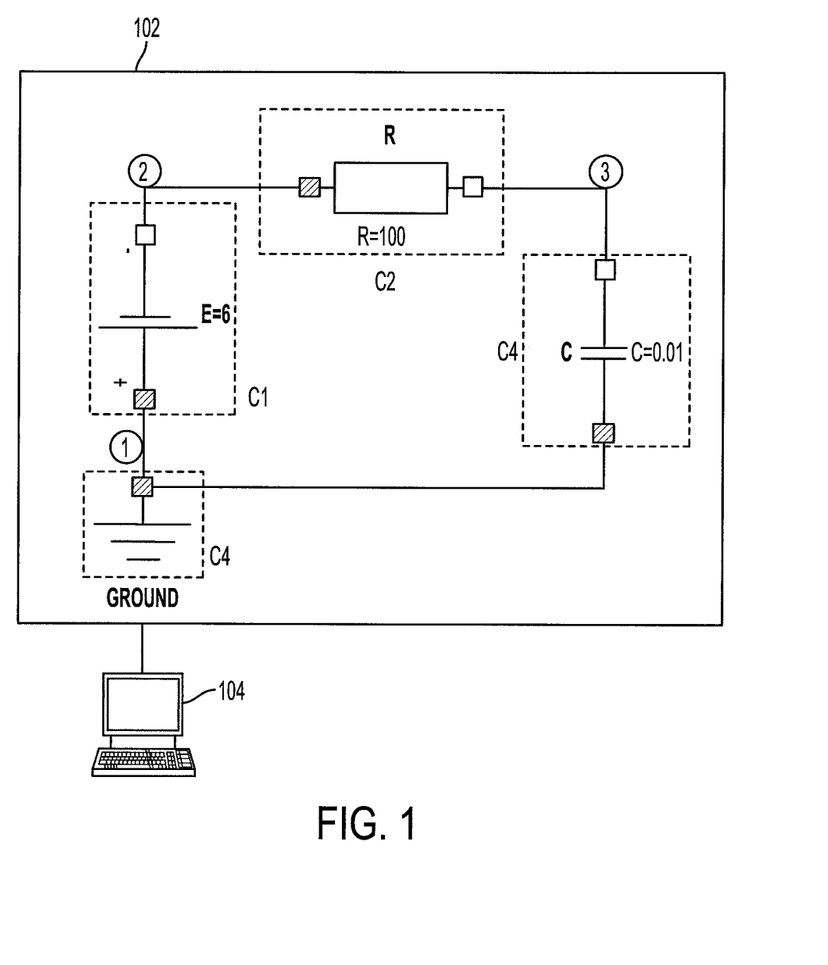
FIG. 1 shows an example of an acausal electrical system with four components.

One current challenge is learning models of physical components in partially known systems. Such systems are inherently acausal. For a system with continuous states only, the system's behavior can be represented as a differential algebraic equation (DAE) of the form:

$$0 = F(\dot{x}, x, z; w) \quad (1)$$

$$y = h(x, z; w) \quad (2)$$

Where F, h are vector valued continuous maps, x is the state vector, z is the vector of algebraic variables, y is the vector of outputs, and w is the vector of parameters. An acausal system is composed of variables attached to its components and relations between them. The relations are induced by the parameterized constitutive equations and the connections between components. Unlike causal (or signal-flow) models, acasual models preserve the physical semantics. FIG. 1 shows an example of an acausal electrical system with four components; and, the constitutive and connection equations are as follows.

Constitutive Equations:

$C1: E = v_E^{(1)} - v_E^{(2)}$ $C2: Ri_R = v_R^{(2)} - v_R^{(3)}$ $C3: C\dfrac{d}{dt}(v_C^{(3)} - v_C^{(1)}) = i_c$ $C4: v_G^{(1)} = 0$ Connection Equations:

$v_E^{(2)} = v_R^{(2)}$ $v_R^{(3)} = v_C^{(3)}$ $v_E^{(1)} = v_C^{(1)} = v_G^{(1)}$ $i_E = i_R = i_C$

In addition, it should be noted that the parameters of the constitutive equations are usually constrained within some feasibility set. For example, the resistance of an electric resistor must always be positive.

Some embodiments are based on the following steps: (i) selecting a parametric mathematical model for the constitutive equations; and (ii) learning the parameters and a representation/model of the parameter constraints. For the latter, it is possible to use an explore-exploit strategy, where, in the beginning, focus is placed on exploration to learn the constraints representation. Later, as the constraints representation becomes more informative, the focus is shifted towards finding the best feasible parameters of the constitutive equations. Having a representation for parameter constraints serves to: decrease the complexity of the search; provide a good initial condition when new data is available for refining the component's parametric model and the constraints representation; and enable a physical interpretation of the component model. Recent results in learning physical laws describing system/component behavior were fueled by the reignited interest in machine learning and its derivative, deep learning. In (Michael B Chang, Tomer Ullman, Antonio Torralba, and Joshua B Tenenbaum. A compositional object-based approach to learning physical dynamics. arXiv preprint arXiv:1612.00341, 2016) the authors used a neural network architecture for learning predictive models of intuitive physics from images. A sparse regression method was used in (S. Brunton, J. N. Kutz, and J. Proctor. Data-driven discovery of governing physical laws. *SIAM News*, 50(1), 2017; Samuel H. Rudy, Steven L. Brunton, Joshua L. Proctor, and J. Nathan Kutz. Data-driven discovery of partial differential equations. *Science Advances*, 3(4), 2017) to discover the (partial) differential equations describing the governing physical laws. A rather unscalable method based on a genetic algorithm to distill the free-form laws from measurements was proposed in (Michael Schmidt and Hod Lipson. Distilling free-form natural laws from experimental data. *Science*, 324(5923):81-85, 2009).

Working assumptions are: (i) the physical system is described by interconnections of physical components; (ii) the constitutive equations of the system components are known for a subset of the components only; and (iii) observations of the system behavior are available. As described herein, there is not necessarily direct access to the component variable. Having a component based description of a physical system enables a range of model-based analytics methods for controls (Carlos E. Garca, David M. Prett, and Manfred Morari. Model predictive control: Theory and practicea survey. *Automatica,* 25(3):335-348, 1989.), diagnosis (H. Alwi, C. Edwards, and C. P. Tan. *Fault Detection and Fault-Tolerant Control Using Sliding Modes.* Springer, London, 1974 (ISBN: 0-12-078250-2); Johan De Kleer and Brian C Williams. Diagnosing multiple faults. *Artificial intelligence,* 32(1):97-130, 1987) and prognosis (Andrew K. S. Jardine, Daming Lin, and Dragan Banjevic. A review on machinery diagnostics and prognostics implementing condition-based maintenance. *Mechanical Systems and Signal Processing,* 20(7):1483-1510, 2006). The working assumption (ii) is more frequent than one may imagine. Often system manufacturers would like to improve their offerings by including (model-based) diagnosis and prognostics features in their products. However, they do not always have access to detailed specifications of the sub-components, when such sub-components are acquired from third-parties, due to proprietary reasons. The inventors have faced several such cases in recent industry-related projects. In one such engagement (I. Matei, A. Ganguli, T. Honda, and J. de Kleer. The case for a hybrid approach to diagnosis: A railway switch. In *Proceedings of the 26th International Workshop on Principles of Diagnosis (DX-2015),* pages 225-232, August 2015.), although the inventors had the structural description of a rail switch, and part of the electrical specifications, the inventors had challenges in finding out the specifications for some of the mechanical parts. The work described in this paper provides a solution to such a problem.

In the fortunate case where there is qualitative information about the behavior of the system, that is, we know the constitutive equations but not the parameter values, the learning problem becomes a standard parameter estimation problem, which has a long history (Y. Bard. *Nonlinear Parameter Estimation.* Academic, New York, 2011 (ISBN: 978-0-85729-649-8)). In one scenario, though, such information is not available. Hence, we must propose an acausal model for the unknown component such that at minimum, when included in the system model, the DAE (1) is solvable. The approaches described herein call such models feasible. A higher goal is reusability of the component model. This means that when the unknown physical component is used in a different configuration, the real and simulated behaviors must be similar. Learning a reusable component, however, requires experimental data corresponding to a variety of use cases for the component. In certain embodiments described herein, the focus is mainly on feasibility. From a numerical point of view, feasibility translates to solving the DAE (1) and determining the trajectory of x(t) and z(t) over some time interval and for some initial conditions. This process requires the Jacobian $$\frac{\partial F}{\partial \eta}(\eta(t)),$$

($\eta$(t)), with $\eta^T=[\dot{x}^T, z^T]$ to be invertible along the trajectory of the system. If this property fails at some point along the trajectory, the numerical simulation will fail. The approaches described herein have the following definition of a feasible component model.

A component model is feasible if, for example, when used in a system model, the Jacobian $$\frac{\partial F}{\partial \eta}(\eta(t))$$

($\eta$(t)) is invertible along the trajectory of the system.

In one non-limiting example of this, assume that instead of having a linear model for the resistor, its constitutive equation is given by a nonlinear model $f(i_R, v_R^{(2)}, v_R^{(3)}; w)=0$, where w denotes the parameters of the resistor. After the elimination of the trivial equations, the electric circuit's DAE is given by $$0 = f(i_R, E, v_C^{(3)})$$
$$0 = -v_C^{(3)} + \frac{1}{C} i_R$$

with solvability determining Jacobian matrix $$\frac{\partial F}{\partial \eta} = \begin{bmatrix} \frac{\partial f}{\partial i_R} & 0 \\ -\frac{1}{C} & 1 \end{bmatrix} \quad (3)$$

Therefore, whatever form for f and parameters w are chosen, a minimum requirement is for matrix (3) to be invertible, which translates in this particular case to the invertibility of $$\frac{\partial f}{\partial i_R}.$$

For a fixed f, a poor choice of w can break invertibility. (The DAE in this case is semi-explicit. For such a type, the invertibility of $$\frac{\partial F}{\partial \eta}$$

reduces to the invertibility of the Jacobian of the algebraic constraints, namely $$\frac{\partial f}{\partial i_R}).$$

Knowing the feasibility set of w a-priori is not a trivial matter even for a simple electric circuit, let alone for a complex system with hundreds or possible thousands of components. Add to this the additional challenge that even if we find a set of feasible parameters for a given configuration of the system, it is not guaranteed they will be feasible for a different configuration. This is a consequence of the fact that the new Jacobian may be significantly different.

In what follows, it is assumed that the unknown constitutive equations of a component are represented by a system of equations $G(\xi;w)=0$, where G is a differentiable vector valued function, $\xi$ is the vector of variables of the component and w is the vector of unknown parameters. To learn w, it is assumed there is access to a set of measurements $y_m$ over some time interval, that gives indirect information about the behavior of the component. These measurements are used to solve a nonlinear least-square problem with constraints:

$$\min_w J(w) \quad (4)$$

$$\text{subject to: } w \in \mathcal{W} \subset \mathbb{R}^n, \quad (5)$$

where $$J(w) = \frac{1}{N} \sum_{i=0}^{N} \|y_m(t_i) - y(t_i;w)\|^2, \, y(t_i;w)$$

are the simulated measurements, $\{t_i\}_{i \geq 0}$ represents a sequence of instances at which measurements are taken, and $\mathcal{W}$ is the unknown feasibility set. One objective is to come up with a method that can jointly learn the optimal w and at least part of the set $\mathcal{W}$.

Models for Physical Components

FIG. 1 considered a system created using electrical components. Particularly, FIG. 1 shows model or physical component 102 connected to computer 104. The components of the physical component 102 shown in FIG. 1 have pins through which they interact with other components. In particular, a pin is characterized by two variables: current and potential. The current is a flow variable that is conserved at the connection point. In literature, the current and the potential are referred as through and across variables, respectively. The pins are generally referred to as connectors and regardless of the physical domain, they have at least one flow variable and a potential like variable (in the thermo-fluid domain there may be several such variables).

Figure 2:
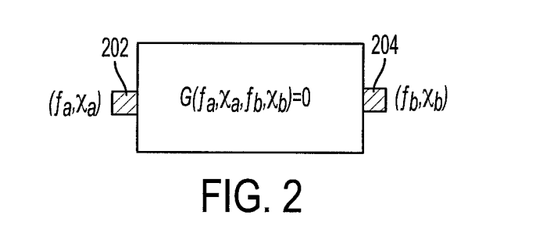
FIG. 2 shows a template for a memoryless component.

FIG. 2 shows a template for memoryless component. Some embodiments described herein consider two pins (connectors) components 202, 204, as shown in FIG. 2. Each connector 202, 204 has two variables: a flow variable f and a potential like variable x. Depending on the physical domain, the flow variable can be current (electric), force (translational mechanics), torque (rotational mechanics) or heat flow rate (thermal). The variable x can represent electric potential (electric), displacement (translational mechanics), angle (rotational mechanics) or temperature (thermal). The constitutive equations of the model are a set of equations that describe the relations between the pairs of variables $(f_a,x_a)$ and $(f_b,x_b)$. In the case of a memoryless component, there is $G(f_a,f_b,x_a,x_b,u;w)=0$, where $G: \mathbb{R}^4 \to \mathbb{R}^2$ is a vector valued differentiable map that constrains the connector variables, and w is a vector of parameters. For example, in the case of the electrical resistor we have $f_a+f_b=0$ and $wf_a=x_a-x_b$. Note that G defines only 2 equations for the 4 variables. When connected to other components, additional equations are generated from the constitutive equations of the other components and from the connection equations. In the simplest scenario, 2 of the 4 variables are independently computed from other equations. This is the case, where one connector is connected to the ground (zero potential) and the remaining one is connected to a current or voltage source. In more complicated scenarios, the behavior of the system is described by a set of algebraic equations, where the variables of all components are computed simultaneously. Some approaches described herein model components with memory as well by including derivatives of the component's variables: $G(\xi;w)=0$, where $\xi=[f_a,f_a^1,\ldots,f_a^m,f_b,f_b^1,\ldots,f_b^m,x_a,x_a^1,\ldots,x_a^n,x_b,\ldots,x_b^n]$, with $x^{(n)}$ the $n^{th}$ derivative of x. It may appear that we have $2\times(n+1)+2\times(m+1)$ variables and only two equations (G remains a two dimensional vector valued function). For these type of components, however, only the largest derivative are unknown variables, while the lower order derivatives are assumed known from the previous integration step.

Without any prior information about the component, choosing the structure for G is more of an art than science. The simplest form can be a linear regression model $G(\xi;w)=W\xi_{ext}$ where W is a matrix of parameters, and $\xi_{ext}$ is a vector of "features" whose elements are powers of $\xi$' entries. For example, in the memoryless case we can have $\xi_{ext}=[f_a,f_a^2,f_a^3,f_b,f_b^2,f_b^3,x_a,x_a^2,x_a^3,x_b,x_b^2,x_b^3]$. More complex behaviors can be achieved by considering also multiplications of powers of $\xi$' entries, as proposed in (Samuel H. Rudy, Steven L. Brunton, Joshua L. Proctor, and J. Nathan Kutz. Data-driven discovery of partial differential equations. *Science Advances*, 3(4), 2017). Recalling that neural networks (NNs) are universal approximators (G. Cybenko. Approximation by superpositions of a sigmoidal function. Mathematics of Control, Signals and Systems, 2(4):303-314, December 1989), we can choose G to be described by a NN, where the input is the vector $\xi$ and the outputs must follow targets that are the zero constants. Note however, that we would regard the NN as a bidirectional graph. That is, it represents a set of equations and not a set of assignments.

Thus, some techniques described herein may be used for diagnosis based on the model. For example, the model may be used to determine that something is wrong with a component, and, in response to the determination, an audio or visual alarm may be sent. In some embodiments, this may apply to rail switches, circuits, electric motors, wind turbines, elevators, mechanical breaks, other mechanical components, and so forth.

Special Cases

As mentioned above, the map G can potentially take any mathematical representation as long as the resulting model is feasible. Inspired by the constitutive equation templates of physical components used in physics-based modeling, approaches described herein consider the following special cases.

Type 1: One of the most common behavioral template corresponds to the case where no flow is lost through the components. The constitutive equations are given by:

$$G_1(f_a,f_b)=(f_a+f_b)=0 \quad (6)$$

$$G_2(f_a,\ldots,f_a^{(m)},x_a-x_b,\ldots,x_a^{(n)}-x_b^{(n)};w)=0 \quad (7)$$

This templates covers linear or nonlinear components from multiple domains such as resistors, capacitors, inductors, springs, or dampers (see Table I).

Type 2: There are physical components that suffer flow losses. Hence the flow at the two connectors will be different. The template for this case can be expressed as $$G_1(x_a,x_b)=(x_a-x_b)=0 \quad (8)$$

$$G_2(f_a,\ldots,f_a^{(m)},f_b,\ldots,f_b^{(m)},x_a,\ldots,x_a^{(n)};w)=0 \quad (9)$$

TABLE 1

Examples of Type 1 linear components

| | |
|---|---|
| resistor/spring | $f_a = w(x_a - x_b)$ |
| capacitor/damper | $f_a = w(x_a^{(1)} - x_b^{(1)})$ |
| inductor | $f_a^{(1)} = w(x_a - x_b)$ |
| spring damper | $f_a = w_1(x_a - x_b) + w_2(x_a^{(1)} - x_b^{(1)})$ |

A typical example that corresponds to this template is the mechanical brake whose equations are given by $x_a = x_b$ and $f_a + f_b = g(x_a, \ldots, x_a^{(n)}; w) = 0$, where g is a map that determines the flow loss as a function $x_a$ and its derivatives, and possible an external signal. For example, for viscous loss we have $g(x_a^{(1)}, u; w) = u \cdot w \cdot x_a^{(1)}$. Variable u is an exogenous signal that activates/deactivates the brake.

Type 3: There are cases where the flow and potential like equations are completely separate, with corresponding template $$G_1(f_a, \ldots, f_a^{(m)}, f_b, \ldots, f_b^{(m)}; w) = 0 \quad (10)$$

$$G_2(x_a, \ldots, x_a^{(n)}, x_b, \ldots, x_b^{(n)}; w) = 0 \quad (11)$$

This is the case of ideal transformers, or in particular ideal gears where $G_1(f_a, f_b) = f_a + w f_b$ and $G_2(x_a, x_b; w) = w x_a - x_b$.

Joint Learning and Constraint Discovery

Some implementations choose a parametric model for G, and it would be advantageous to learn its parameters to best match the experimental data. In the beginning, no information about the feasibility set is available. Hence it is necessary to gradually acquire data, optimize the parameter of G and build a model for the feasibility set. The approaches described herein propose a sequential scheme under which, in the beginning, encourages exploration of points with high uncertainty, while trying to stay close to parameter values the decrease the cost function J(w). In what follows, it is assumed that J(w) has a least one (local) minimizer. The scheme is enabled by the following result.

Proposition 3.1: Let $\{g_k\}_{k \geq 0}$, with $g_{k,i}: \mathbb{R} \to [a_i, b_i]$, $i = 1, 2$ be two convergent sequences of continuously differentiable scalar functions, with $$\lim_{k \to \infty} g_{k,i} = g_i.$$

They induce the sequence of optimization problems $$(P_k): \min_w J(w) \quad (12)$$

$$\text{subject to: } g_{k,i}(w) \leq 0, \; i = 1, 2, \quad (13)$$

where each problem $(P_k)$ admits at least a local minimizer $w^*_k$ as solution. Then the limit points $w^*$ of the sequence $\{w^*_k\}_{k \geq 0}$ are solutions of the problem $$(P): \min_w J(w)$$

$$\text{subject to: } g_i(w) \leq 0, \; i = 1, 2.$$

The proof follows from a continuity argument. In the setup J is the cost function introduced in (4) and $g_i(w)$ are constraint functions related to the feasibility set. They evolve with each iteration k, as our understanding of the feasibility set of w improves.

Some embodiments model the feasibility of a point by a binary function $p(w) \in \{0, 1\}$, where $p(w) = 1$ if w is feasible and zero otherwise. If we could initially probe the feasibility of every possible point, we could build the map $p(\cdot)$ which would describe the feasibility space. Obviously, this is a hopeless scenario. The best we can hope for is to have a significantly large data set of points for which the feasibility was tested.

Let $S \subset \mathbb{R}^n$ be an (arbitrarily large) compact set. We want to find an approximation of p(w) modeled as a smooth, parameterized function $q: S \to [0, 1]$, with $q(w) = q(w; \beta)$. This approximation is obtained by minimizing the cross-entropy loss function $H(\beta; S) = -\int_S [p(w) \log_2 q(w; \beta) + (1 - p(w)) \log_2 (1 - q(w; \beta))] dw$. We denote by $q^*(w) = q(w; \beta^*)$ the best approximation of p, where $\beta^* = \arg\min_\beta H(\beta; S)$, and $H^*(S) = H(\beta; S)$. The function $q^*$ represents a goal function in an ideal scenario where we can probe the feasibility of any point w in the set S. The following result shows how we can arrive at $q^*$ through successive learning of approximations of p, as we keep probing the set S.

Proposition 3.2: Let $\{S_k\}_{k \geq 0}$ be an increasing sequence of sets of discrete points, such that $U_{k \geq 0} S_k = S$. Let $\{q_k(w)\}_{k \geq 0}$ be a sequence of approximations of p(w), where $q_k(w) = q(w; \beta_k)$, $\beta_k \arg\min_\beta \tilde{H}(\beta; S_k)$, with $$\tilde{H}(\beta; S_k) = \frac{1}{|S_k|} \sum_{i=1}^{|S_k|} [p(w_i) \log_2 q(w_i; \beta) + (1 - p(w_i)) \log_2 (1 - q(w_i; \beta))].$$

Then $\lim_{k \to \infty} \tilde{H}(\beta_k; S_k) = H^*(S)$, and $\lim_{k \to \infty} q_k = q^*$.

The sets $S_k$ contain samples from the set S. These samples enable the approximation of the entropy $H(\beta; S)$ through the quantity $\tilde{H}(\beta; S_k)$, approximation that becomes more accurate as $S_k$ approaches S. By making S arbitrarily large, we can cover the entire $\mathbb{R}^n$. A possible choice for q is the softmax function $q(w; \beta) = e^{\beta^T w} / [1 + e^{\beta^T w}]$. We can have more complex representations such as NNs where the last layer is the softmax function. Learning the parameters $\beta_k$ is equivalent to training a binary classifier, using a cross-entropy loss function.

We are now ready to define the functions $J_k$ and $g_{k,i}$. In particular, we have $$g_{k,1}(w) = 1 - \delta_{k,1} - q_k(w) \quad (14)$$

$$g_{k,2}(w) = 1 - \delta_{k,2} + q_k(w) \log_2 q_k(w) + [1 - q_k(w)] \log_2 [1 - q_k(w)] \quad (15)$$

where $\{\delta_{k,2}\}_{k \geq 0}$ is a positive sequence with $\lim_{k \to \infty} \delta_{k,1} = \varepsilon$, $0 < \varepsilon \ll 1$ and $\delta_{0,1} = 1$, and $\{\delta_{k,2}\}_{k \geq 0}$ is an increasing sequence of positive values such that $\lim_{k \to \infty} \delta_{k,2} = 1 + \varepsilon$, with $\delta_{1,2} = \varepsilon$. The function $q_k(w)$ was introduced in Proposition 3.2. The second constraint (15) uses an entropy like term, whose purpose is to encourage exploration of points with higher uncertainty. This term loses importance as the model of $q_k$ is improved. At the limit, the constraint (14) becomes $q^*(w) \geq 1 - \varepsilon$, while (15) becomes $q^*(w) \log q^*(w) + [1 - q^*(w)] \log [1 - q^*(w)] \leq \varepsilon$, which is satisfied for any w. Hence, this constraint disappears in the limit. This ensures that the solution of the optimization problem is feasible with high likelihood. At the first iteration, when no data is available, we make sure that $q_0(w) = 0.5$ for all w. This means that all points have maximum uncertainty. Since the entropy at this value is 1, it also ensures that $(P_0)$ has a solution. In the case of the softmax function, this happens if we enforce $\beta_0 = 0$. Therefore, at the initial iteration, we solve an unconstrained optimization problem. At the second iteration, $q_1(w)$ is a smooth function that passes through the point 0.5, hence there will exist w such that the constraint (15) is satisfied. The scalar $\varepsilon$ accounts for the fact that $q^*(w)$ is in the end an approximation of p(w).

So far we have not addressed the procedure of accumulating data for training the intermediate feasibility models $q_k(w)$. At each iteration k, the optimization algorithm generates data points in its search for the minimizer. The search requires function evaluations, which in turn requires the simulation of the model. Hence each point tested while searching for a better point at iteration k is labeled as feasible or unfeasible, depending on the success of the simulation. In the beginning of the iterative process, the second constraint (15) pushes the search towards points with high uncertainty, helping this way exploring points that were not visited before. This strategy however cannot guarantee that when we stop iterating over k the data-set $S_k$ is sufficiently large and informative so that the resulting feasibility model $q_k(w)$ closely match the entire landscape defined by p(w). Still, it can provide a good local representation of the feasibility set along the trajectory generated as part of the optimization process. We summarize the approach described so far in Algorithm 1 below. Line 6 of this algorithm solves the constrained optimization problem (12)-(13) and returns the solution and all points visited plus their labels during the solution search. Since it used a previous model of function q, it can be interpreted as containing also a prediction step, since the feasibility of any visited point is predicted by q. In line 8, the feasibility model is retrained based on the newly acquired data. If the data set $\mathcal{D}$ becomes significantly large, we can use online learning. For example, we can execute a batch learning update step, where the gradient that dictates the update direction is computed using the newly acquired data only. A more extreme change is to transfer the update of the feasibility model inside the cost function evaluation. There we can use one step of the stochastic gradient descent algorithm after each simulation.

Algorithm 1 Learning with constraints dicovery

```
1:   procedure OPTWITHCONSTRDISCOVERY(w₀)
2:       w ← w₀
3:       𝒟 ← {∅}
4:       q(w) ← 0.5, ∀w
5:       while solution improvement do
6:           (w,data) ← compute solution of (12)-(13) given
         w,q
7:           𝒟 ← 𝒟 ∪ data
8:           q ← retrain feasibility model based on 𝒟
9:       return w,q
```

Pre-Training the Feasibility Model:

We showed how we can build a model for the feasibility set as we move through the optimization process. The disadvantage of this approach is that, in the beginning, there is high uncertainty in the constraint probability model. The feasibility of a point w is based on the success of the simulation at that point, and is not related to the optimization process. Before starting the actual optimization process, we can sample from the component parameter space, execute a simulation for each sample, and use the data for pre-training the probability model $q(w;\beta)$. Although feasible, this approach has the potential to be both time and computational expensive, especially when the system model is complex. A cheaper alternative is to generate much simpler models that include the component we want to learn in different configurations. Such configurations will describe different scenarios for computing the unknown variables of the component's constitutive equations described by $G(\xi;w)=0$, shedding light this way on at least part of the feasible space.

That is, they will generate different structures for the Jacobian matrix of the model that need to be invertible for the simulations to succeed.

Practical Implementation Aspects

Both the search for the best parameters w and the constraints discovery depend on the success of the model simulation for the parameter values that are tested during the optimization procedure. When a simulation fails, we are unable to compute the cost function J(w). Still, some embodiments described herein let the optimization algorithm know that it hit an unfeasible point and encourage it to leave that search region. We implement this using the barrier function idea. Every time a point is unfeasible, it will take a large value that will continue to increase as long as unfeasible points are attempted.

Algorithm 2

Cost function pseudo-code with empirical barrier function

```
1:   function COSTFUNCTION(w)
2:       Simulate model for parameters w
3:       if simulation fails then
4:           counter ← counter + 1
5:           cost ← -log ε/counter, ε ≪ 1
6:       else
7:           counter ← 0
8:           cost ← J(w)
9:       return cost
```

This idea is detailed in Algorithm 2. We chose a logarithmic function as barrier function. Its value increases as the algorithm continues to simulate the model at unfeasible points. This prevents the leveling of the gradient of the cost function. The intermediate optimization problems (12)-(13) are optimization problems with inequality constraints. There are several methods available to solve such problems: penalty methods, barrier methods, primal methods, or sequential quadratic programming (SQP) (D. P. Bertsekas. *Nonlinear Programming*. Athena Scientific, 1999). Among many technical conditions, many of them require twice continuous differentiability of the cost function. For a complex system, even computing the gradient can be challenging. The gradient of cost function J is given by $$\nabla J(w) = -\frac{1}{N}\sum_{i=0}^{N}(y_m(t_i) - y(t_i))\frac{\partial y(t_i)}{\partial w},$$

where $$\frac{\partial y}{\partial w} = \frac{\partial h}{\partial x}\frac{\partial x}{\partial w} + \frac{\partial h}{\partial w},$$

as per equation (2). Even in a simple scenario where h is linear in the state and does not depend on w, we still need $$\frac{\partial x}{\partial w}.$$

Sensitivity analysis capabilities that use forward and backwards methods are already integrated in DAE solvers (Linda Petzold, Shengtai Li, Yang Cao, and Radu Serban. Sensitivity analysis of differential-algebraic equations and partial differential equations. *Computers and Chemical Engineering*, 30(10):1553-1559, 2006) so in theory, we could extract $$\frac{\partial x}{\partial w}$$

from their results. Still obtaining the Hessian is by far not a trivial matter. Fortunately, it can be iteratively approximated using the gradient (Jorge Nocedal. Updating Quasi-Newton Matrices with Limited Storage. *Mathematics of Computation*, 35(151):773-782, 1980). When the gradient is not explicitly available, optimization algorithms resort to numerical approximations. If we do not trust these approximations, another alternative is to resort to gradient free methods such as simplex search based on Nelder-Mead algorithm (M. J. D. Powell. On Search Directions for Minimization Algorithms. *Mathematical Programming*, 4(2)193-201, April 1973.), pattern search (Robert Hooke and T. A. Jeeves. "Direct Search" Solution of Numerical and Statistical Problems. *J. ACM*, 8(2):212-229, April 1961), particle swarm optimization (James Kennedy and Russell C. Eberhart. Particle swarm optimization. In *Proceedings of the IEEE International Conference on Neural Networks*, pages 1942-1948, 1995), genetic algorithms (Melanie Mitchell. *An Introduction to Genetic Algorithms*. MIT Press, Cambridge, Mass., USA, 1998), evolution strategy (Hans-Georg Beyer and Hans-Paul Schwefel. Evolution strategies—a comprehensive introduction. *Natural Computing*, 1(1):3-52, May 2002), Powell's algorithm with its different versions (M. J. D. Powell. An efficient method for finding the minimum of a function of several variables without calculating derivatives. *The Computer Journal*, 7(2):155-162, 1964). Many of the aforementioned algorithms however accept at most box type of constraints.

Hence we need to transform (12)-(13) into unconstrained optimization problems. We implement this using the barrier function idea. Namely, we replace the cost function J(w) in $(P_k)$ by $J_k(w)=J(w)-\lambda_{k,1} \log q_k(w)+\lambda_{k,2}[q_k(w) \log q_k(w)+(1-q_k(w)) \log(1-q_k(w))]$, where $\{\lambda_{k,i}\}_{k \geq 0}$ i=1,2 are sequences of decreasing positive scalars. The new cost function represents a tradeoff between minimizing J(w), choosing points with high feasibility probability and exploring points with high uncertainty. The new sequence of optimization problems $(P_k)$ is a sequence of unconstrained optimization problems for which gradient-free methods can be used.

If sub-optimal solutions are acceptable, we can eliminate the iterative procedure, and solve a one shot optimization problem with cost function: $J'(w)=J(w)-\lambda_1 \log q(w)+\lambda_2[q(w) \log q(w)+(1-q(w)) \log(1-q(w))]$, where q(w) is the feasibility model updated every time a model simulation is executed. This heuristics has a good chance to provide satisfactory results since, as we explore more and more points the entropy term become roughly zero. Moreover, if the search is performed in a feasible region, the second term becomes zero. Hence, the search is mainly focused on minimizing J. We only need to modify the way the cost function is computed, and we can use any unconstrained optimization algorithm. The computations inside the cost function are summarized in Algorithm 3.

---

Algorithm 3

Cost function pseudo-code with constraint discovery

---

1:  $\mathcal{D}$: current training set for $q(w; \beta)$
2:  function COSTFUNCTION(w)
3:      Simulate model for parameters w
4:      if simulation fails then
5:          y ← 0
6:          counter ← counter + 1
7:          $\text{cost} \leftarrow -\log \frac{\varepsilon}{\text{counter}}, \varepsilon \ll 1$
8:      else
9:          y ← 1
10:         counter ← 0
11:         cost ← J'(w)
12:     Augment the training data set: $\mathcal{D} \leftarrow \mathcal{D} \cup \{(w,y)\}$
13:     Update the parameters of the feasibility probability $q(w; \beta)$ based on the augmented set $\mathcal{D}$
14:     return cost

---

In line 13 of Algorithm 3, rather than re-training the parameters β from scratch, we can instead use the on-line gradient descent algorithm, where the gradient of $\tilde{H}(\beta, \mathcal{D})$ defined in Proposition 3.2 is approximated by the gradient of a single example $\beta \leftarrow \beta - \alpha \nabla h(\beta;(w,y))$, where $h(\beta;(w,y))=-y \log q(w;\beta)-(1-y) \log[1-q(w;\beta)]$. For every call of the cost function either to approximate the gradient or to test directions of search in derivative free algorithms, the feasibility probability is updated.

Demonstrative Example

Figure 3:
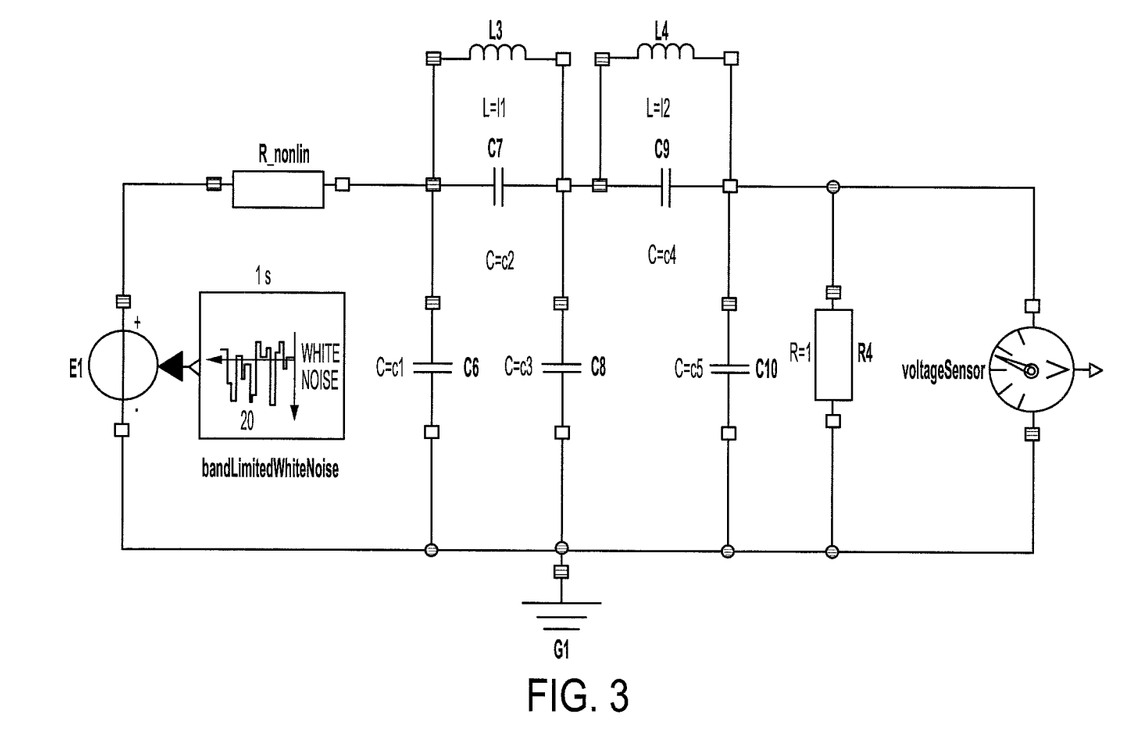
FIG. 3 shows a Cauer filter with a nonlinear resistor.

In some implementations, the goal is to learn the model of the nonlinear resistor R_nonlin in the Cauer filter shown in FIG. 3. The output measurement is the voltage across the resistor R4 over a time interval of 100s. The voltage provides indirect information about the nonlinear resistor behavior. The circuit is powered by a voltage source whose input is a band-limited white noise with normal distribution signal.

Figure 4:
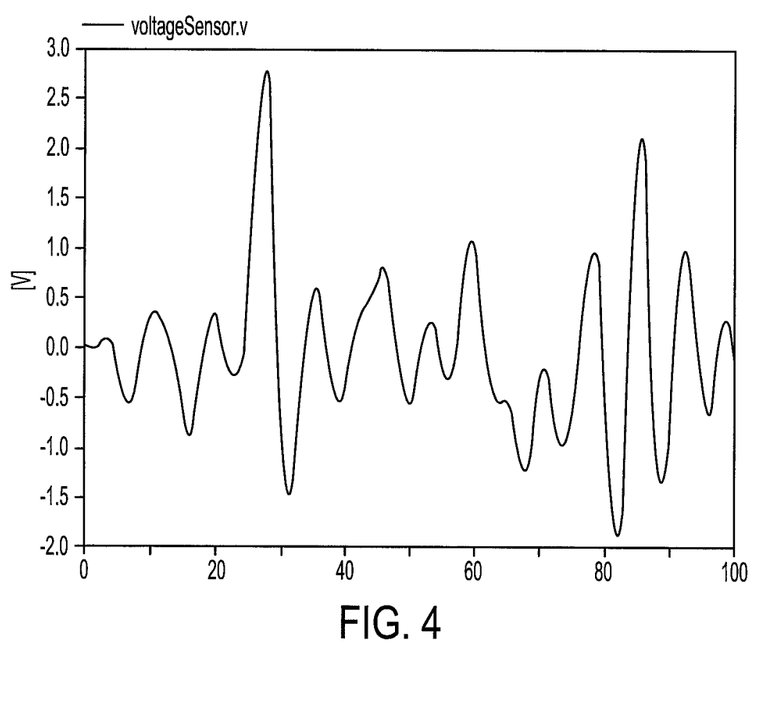
FIG. 4 shows experimental data of the resistor R4 voltage from FIG. 3.

The "experimental" output measurements of the resistor R4 voltage are shown in FIG. 4. The "real" real behavior of the nonlinear resistor is described by $i=0.01 \cdot v^3$, where i and v represent the current and voltage of the resistor, respectively. In the learning process, we model the constitutive equations by the polynomial $w_1 i = w_2 v^2 + w_3 v^3$. In addition to the parameter values, we would like to learn a representation of the the feasibility set corresponding to w. We chose a three dimensional vector of parameters to have a descriptive 3D representation of the feasible sets.

The probability of the vector w to be feasible is modeled using the softmax function $q(w;\beta)=e^{\beta^T w}/(1+e^{\beta^T w})$. This representation will provide us with the hyperplane separating the feasible and unfeasible subspaces. Note that we are making an assumption that indeed such separation is possible. That may not be the case. For more complicated representations, a NN can precede the softmax function. The separating hyperplane is given by $\beta_1 w_1 + \beta_2 w_2 + \beta_3 w_3 = 0$. Therefore w is feasible provided $\beta^T w > 0$.

The learning procedure was implemented in Python by using algorithms from the optimization package in Python's SciPy library (Eric Jones, Travis Oliphant, Pearu Peterson, et al. SciPy: Open source scientific tools for Python, 2001-). The evaluation of the optimization cost function is based on simulations of a Functional Mockup Unit (FMU) (T. Blochwitz, M. Otter, M. Arnold, C. Bausch, C. Clau, H. Elmqvist, A. Junghanns, J. Mauss, M. Monteiro, T. Neidhold, D. Neumerkel, H. Olsson, J. v. Peetz, S. Wolf, Atego Systems Gmbh, Qtronic Berlin, Fraunhofer Scai, and St. Augustin. The functional mockup interface for tool independent exchange of simulation models. In *In Proceedings of the 8th International Modelica Conference*, 2011) generated from the Modelica (Peter Fritzson. *Principles of Object-Oriented Modeling and Simulation with Modelica 3.3: A Cyber-Physical Approach*. IEEE Press. Wiley, Hoboken, N.J., 2 edition, 2015) description of the electrical circuit model.

Figure 5A:
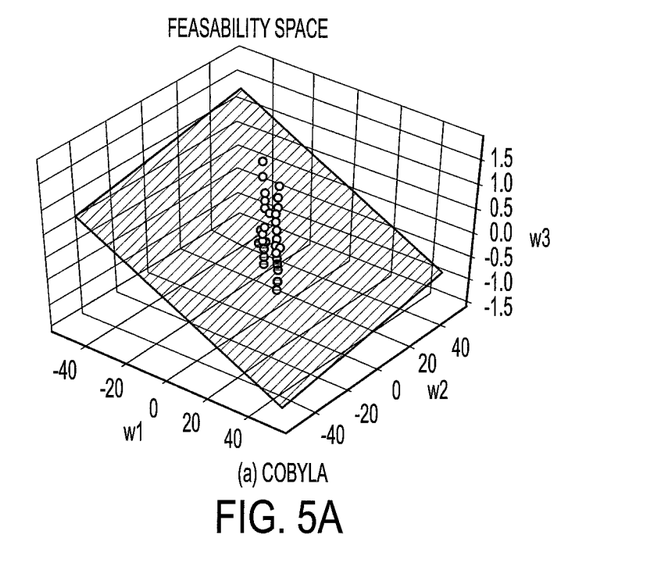
FIG. 5A shows the constrained optimization by linear approximation (COBYLA) results of Algorithm 1.
Figure 5B:
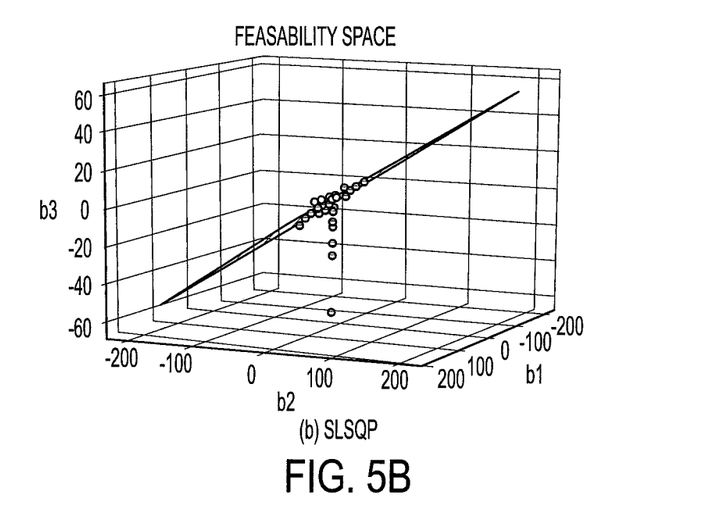
FIG. 5B shows the sequential least squares programming (SLSQP) results of Algorithm 1.

We first implemented Algorithm 1. FIGS. 5A-5B shows separating hyperplane generated by Algorithm 1. More specifically, FIG. 5A shows the COBYLA results of Algorithm 1, and FIG. 5B shows the SLSQP results of Algorithm 1. The inner loop was implemented using two algorithms that accept constraints: COBYLA (M. J. D. Powell. A view of algorithms for optimization without derivatives. Technical report, University of Cambridge, UK, May 2007), a derivative-free algorithm for constrained optimization, and sequential least square programming (SLSQP) (D. Kraft. A Software Package for Sequential Quadratic Programming. Deutsche Forschungs- und Versuchsanstalt für Luft- und Raumfahrt Köln: Forschungsbericht. Wiss. Berichtswesen d. DFVLR, 1988.). We executed 25 outer iterations, and for each internal iteration we limited the maximum number of iterations to 300. The relative error in the minimizer and minimum value were set to xtol=ftol=1e-16. The sequences $\delta_{k,1}$ and $\delta_{k,2}$ were chosen as $\delta_{k,1} = \varepsilon + (1-\varepsilon)(\lambda+\varepsilon)^k$ and $\delta_{k,2} = 1+\varepsilon-\delta^k$, with $\varepsilon=1e-7$ and $\lambda=0.8$. The step-size for the gradient approximation was set to eps=1e-04. The results of the optimization procedure are summarized in Table II.

TABLE II

Gradient free and gradient-dependent algorithms implementation of Algorithm 1.

| Algorithm | Solution w* | Average error |
|---|---|---|
| COBYLA | [1, -9.31240083e-04, 9.22597610e-03] | 0.0028635 |
| SLSQP | [1, -0.00170486, 0.00951815] | 0.00273461 |

The data accumulated using COBYLA shows a more clear separation between feasible and unfeasible parameters. The SLSQP explored mostly points around the separating hyperplane.

Algorithm 3 was tested on both gradient free algorithms and algorithms based on gradient approximations. Comparing the two classes of algorithms is not immediate since the second class depends on a hyper-parameter that controls the gradient approximation. Hence we compare algorithms that belong to the same class only. We limited the maximum number of iterations and the maximum number of function evaluations to 1000 and 1500, respectively. The hyper-parameters of Algorithm 3 were chosen as $\lambda_1=1$ and $\lambda_2=0.1$. We use the same initial condition for all algorithms, namely $w_0=[0.1,0.1,0.1]$. The relative error in the minimizer and minimum value were set to xtol=ftol=1e-16. The optimization results using gradient free algorithms are shown in Table III. Since the solution w* is invariant to scalar multiplication, we can divide the solution by the first component $$w^* \leftarrow \frac{1}{w_1} w^*.$$

TABLE III

Derivative-free optimization algorithms comparison

| Algorithm | Solution w* | Average error |
|---|---|---|
| Powell | [1, -2.20299821e-04, 9.85091226e-03] | 0.00274897 |
| Nelder | [1, -2.37604458e-04, 9.75878109e-03] | 0.00253461 |
| COBYLA | [1, -9.88099227e-04, 9.18751113e-03] | 0.00361726 |

Figure 6A:
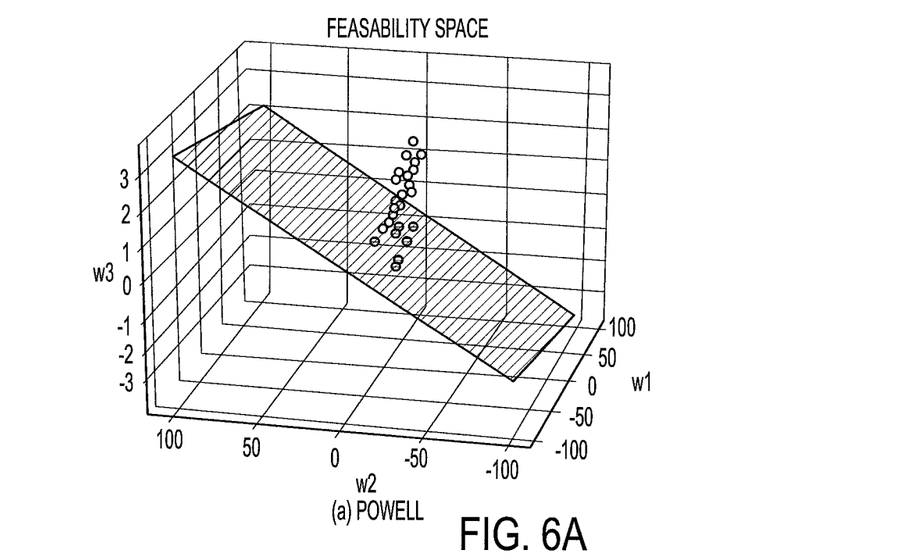
FIGS. 6A-6C show hyperplanes separating for gradient free methods.
Figure 6B:
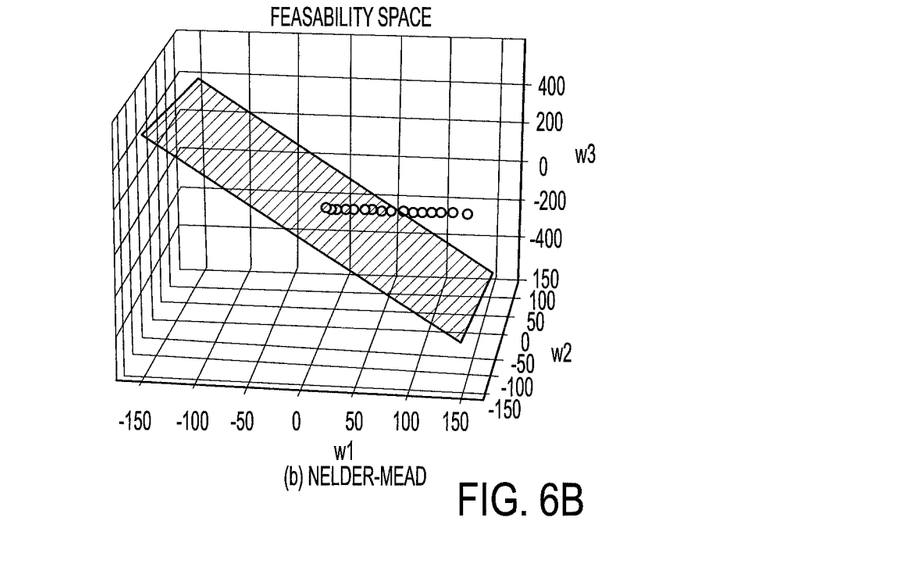
Figure 6C:
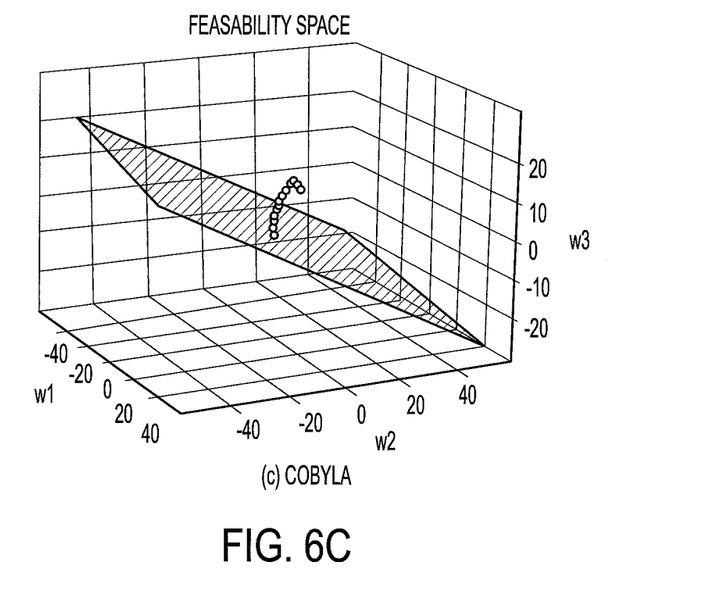

We are interested in $w^*_2$ and $w^*_3$. In particular, for all three algorithms $w^*_3$ gets close to its real value. The separating hyper-planes for gradient free methods are shown in FIGS. 6A-6C; particularly, FIG. 6A shows this with respect to Powell, FIG. 6B shows this with respect to Nelder-Mead, and FIG. 6C shows this with respect to COBYLA. It should not come as a surprise that the each algorithm learned a different hyper-planes. The parameters of these hyper-planes are computed based on the trajectories generated by each algorithm; trajectories that are different from algorithm to algorithm.

Next, we used algorithms that use gradient approximations: Broyden-Fletcher-Goldfarb-Shanno (BFGS) algorithm, limited memory BFGS algorithm (L-BFGS) (Jorge Nocedal. Updating Quasi-Newton Matrices with Limited Storage. Mathematics of Computation, 35(151):773-782, 1980), nonlinear conjugate gradient algorithm (CG) (R. Fletcher and C. M. Reeves. Function minimization by conjugate gradients. The Computer Journal, 7(2):149-154, 1964) and SLSQP. Their results are shown in Table IV. In addition to the settings used in the case of gradient-free algorithms, we set the step size for the gradient approximation to eps=1e-4.

TABLE IV

Derivative-free optimization algorithms comparison.

| Algorithm | Solution w* | Average error |
|---|---|---|
| BFGS | [1, 8.28670889e-05, 9.76706821e-03] | 0.00276546 |
| SLSQP | [1, -0.00254604, 0.00777795] | 0.00769311 |
| CG | [1, -0.00137244, 0.00865319] | 0.00464650 |
| LBFGS | [1, -6.96951339e-04, 9.79259844e-03] | 0.00254597 |

Figure 7A:
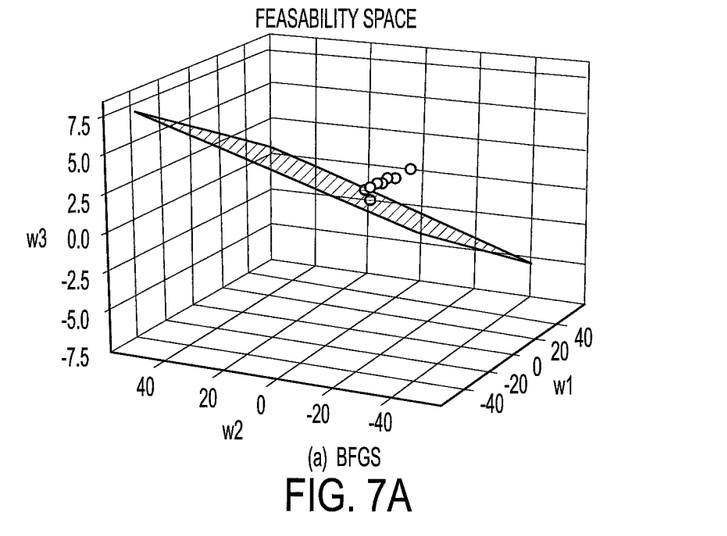
FIGS. 7A-7D show hyperplanes separating for algorithms using gradient approximations.
Figure 7B:
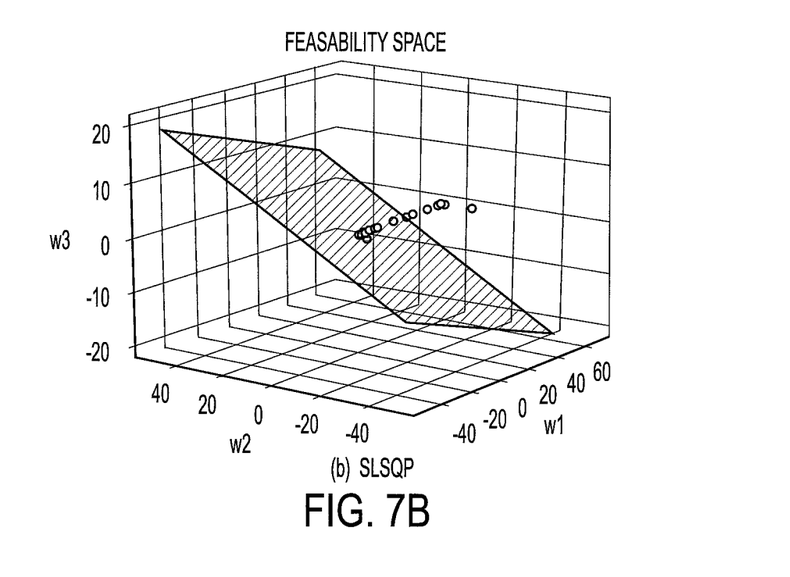
Figure 7C:
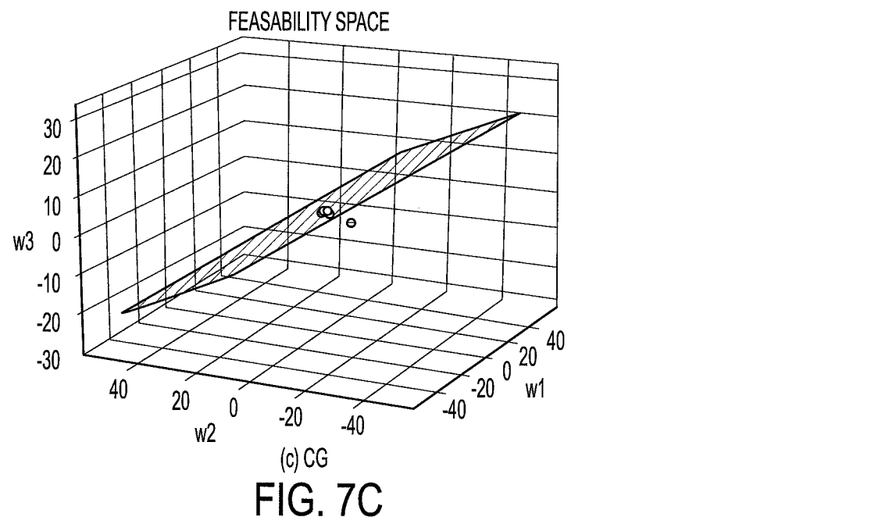
Figure 7D:
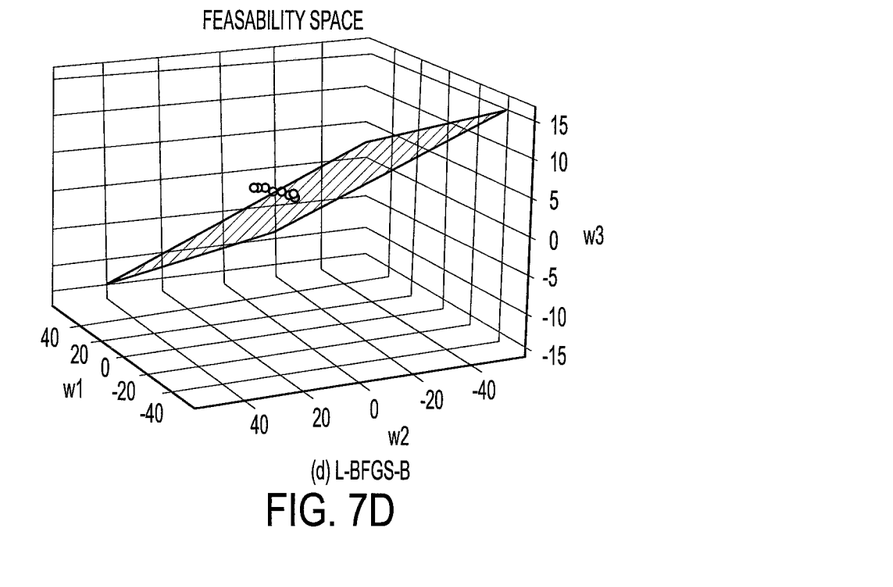

FIGS. 7A-7D show hyperplanes separating for algorithms using gradient approximations. Particularly, FIG. 7A shows this with respect to BFGS, FIG. 7B shows this with respect to SLSQP, FIG. 7C shows this with respect to CG, and FIG. 7D shows this with respect to L-BFGS-B.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. An apparatus for modeling a physical component of a partially known system, wherein the physical component has a vector of unknown parameters, and the apparatus comprises:

at least one processor;
at least one memory including computer program code; and the at least one memory and the computer program code configured to, with the at least one processor, cause the apparatus at least to:

build a binary function that models feasibility of points based on the vector of unknown parameters;

at a first iteration, build a sequence of approximations of the binary function, wherein at the first iteration, the sequence of approximations is set to 0.5 for all the vector of unknown parameters;

at a second iteration, update the sequence of approximations of the binary function at least in part based on a minimum of a cost function of the vector of unknown parameters; and generate model-based diagnostics of the partially known system based on the updated sequence of approximations of the binary function.

2. The apparatus of claim 1, wherein the binary function is $p(w) \in \{0,1\}$, where:

w is the vector of unknown parameters; and $p(w)=1$ if w is feasible and zero otherwise.

3. The apparatus of claim 1, wherein:

the sequence of approximations is represented by $q(w)$, where w is the vector of unknown parameters.

4. The apparatus of claim 1, wherein:

the cost function is $J(w)$, where w is the vector of unknown parameters;

the update of the sequence of approximations of the binary function happens by using an optimization problem of the $J(w)$; and the optimization problem is constrained by $g_i(w) \leq 0$, where i=1, 2 and $g_i$ is a constraint function, where $g_i(w)$ are functions of approximations functions $q(w)$.

5. The apparatus of claim 1, wherein:

at the first iteration, the sequence of approximations of the binary function is built by minimizing a cross-entropy loss function.

6. The apparatus of claim 1, wherein the at least one memory and the computer program code configured to, with the at least one processor, further cause the apparatus to:

subsequent to the second iteration, iterate by updating the sequence of approximations of the binary function at least in part based on the minimum of the cost function of the vector of unknown parameters; and at a subsequent iteration, generate an audio or visual alarm based on an updated sequence of approximations of the binary function.

7. The apparatus of claim 1, wherein the component is one of: a rail switch, a circuit, an electric motor, a wind turbine, an elevator, or a mechanical break.

8. The apparatus of claim 1, wherein the at least one memory and the computer program code configured to, with the at least one processor, further cause the apparatus to:

enable model-based diagnostics of the component using the updated sequence of approximations.

9. An apparatus for modeling a physical component of a partially known system, wherein the physical component has a vector of unknown parameters, and the apparatus comprises:

at least one processor;

at least one memory including computer program code; and the at least one memory and the computer program code configured to, with the at least one processor, cause the apparatus at least to:

build a binary function that models feasibility of points based on the vector of unknown parameters;

build a sequence of approximations of the binary function;

follow an iterative process with at least two iterations, each iteration including:

updating the sequence of approximations of the binary function by taking into account a minimum of a cost function of the vector of unknown parameters, wherein cost function is subject to a constraint that has an effect of prioritizing exploration of the feasibility of points with a first level of uncertainty over exploration of the feasibility of points with a second level of uncertainty, and the effect of prioritizing is a weight for finding the best feasibility of points for the sequence of approximations, wherein the first level is greater than the second level; and generate model-based diagnostics of the partially known system based on the updated sequence of approximations of the binary function.

10. The apparatus of claim 9, wherein, as the process iterates, the prioritizing effect of the constraint diminishes.

11. The apparatus of claim 10, wherein the constraint satisfies a requirement that the prioritizing effect approaches zero as a number of iterations approaches infinity.

12. The apparatus of claim 9, wherein the cost function is subject to a constraint that the prioritizing effect diminishes as the process iterates.

13. The apparatus of claim 9, wherein the cost function is subject to the constraint that has the effect of prioritizing exploration of a point that has a first uncertainty over exploration of another point that has a second uncertainty, wherein the first uncertainty is greater than the second uncertainty.

14. A method for modeling a physical component of a partially known system, wherein the physical component has a vector of unknown parameters, and the method comprises:

building a binary function that models feasibility of points based on the vector of unknown parameters;

during a first iteration, building a sequence of approximations of the binary function, wherein at the first iteration, a sequence of approximations is set to 0.5 for all the vector of unknown parameters;

during a second iteration, updating the sequence of approximations of the binary function at least in part based on a minimum of a cost function of the vector of unknown parameters; and generate model-based diagnostics of the partially known system based on the updated sequence of approximations of the binary function.

* * * * *